US009317462B2

(12) United States Patent
Pean et al.

(10) Patent No.: US 9,317,462 B2
(45) Date of Patent: *Apr. 19, 2016

(54) MICROCONTROLLER PERIPHERAL DATA TRANSFER REDIRECTION FOR RESOURCE SHARING

(71) Applicant: Atmel Corporation, San Jose, CA (US)

(72) Inventors: Guillaume Pean, Aix-en-Provence (FR); Franck Lunadier, Trets (FR); Alain Vergnes, Trets (FR)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,074

(22) Filed: Mar. 16, 2015

(65) Prior Publication Data
US 2015/0186314 A1 Jul. 2, 2015

Related U.S. Application Data

(63) Continuation of application No. 13/309,741, filed on Dec. 2, 2011, now Pat. No. 8,984,195.

(51) Int. Cl.
G06F 13/00 (2006.01)
G06F 13/364 (2006.01)
G06F 13/28 (2006.01)
G06F 13/40 (2006.01)
H04L 9/06 (2006.01)

(52) U.S. Cl.
CPC .............. *G06F 13/364* (2013.01); *G06F 13/00* (2013.01); *G06F 13/28* (2013.01); *G06F 13/4022* (2013.01); *H04L 9/0631* (2013.01)

(58) Field of Classification Search
USPC .................................. 710/104, 119, 305, 311
See application file for complete search history.

(56) References Cited

U.S. PATENT DOCUMENTS 6,665,755 B2 * 12/2003 Modelski et al. ............. 710/100
6,668,287 B1 * 12/2003 Boyle et al. .................... 710/22

(Continued)

OTHER PUBLICATIONS

Non-Final Office Action dated Dec. 2, 2011, U.S. Appl. No. 13/309,741 (7 pages).

(Continued)

*Primary Examiner* — Raymond Phan
(74) *Attorney, Agent, or Firm* — Fish & Richardson P.C.

(57) ABSTRACT

A system includes one or more master modules configured to execute instructions embedded in non-transitory machine-readable media and controllable by a processor. The system also includes one or more peripheral modules that are configured to execute instructions embedded in non-transitory machine-readable media and controllable by the processor. The system also includes a system bus with instructions embedded in a non-transitory machine-readable medium and configured to allow data transfer between the processor and the one or more peripheral modules. A data processing module of the one or more peripheral modules includes a master interface and a slave interface. Both master and slave interfaces are coupled to the system bus.

25 Claims, 5 Drawing Sheets

(56) References Cited

U.S. PATENT DOCUMENTS

| | | | |
|---|---|---|---|
| 6,741,253 B2 * | 5/2004 | Radke et al. | 345/531 |
| 6,934,780 B2 * | 8/2005 | Modelski et al. | 710/100 |
| 6,981,077 B2 * | 12/2005 | Modelski et al. | 710/100 |
| 6,981,088 B2 * | 12/2005 | Holm et al. | 710/306 |
| 7,159,048 B2 * | 1/2007 | Roach et al. | 710/22 |
| 8,984,195 B2 * | 3/2015 | Vergnes et al. | 710/110 |
| 2002/0120798 A1 * | 8/2002 | Modelski et al. | 710/107 |
| 2006/0031614 A1 * | 2/2006 | Takaba | 710/110 |
| 2006/0179192 A1 * | 8/2006 | Ganasan et al. | 710/110 |

OTHER PUBLICATIONS

Final Office Action dated Jul. 17, 2014, U.S. Appl. No. 13/309,741 (6 pages).

Notice of Allowance dated Nov. 7, 2014, U.S. Appl. No. 13/309,741 (5 pages).

* cited by examiner

MICROCONTROLLER PERIPHERAL DATA TRANSFER REDIRECTION FOR RESOURCE SHARING

CROSS-REFERENCE TO RELATED APPLICATIONS

This application is a continuation of U.S. application Ser. No. 13/309,741, filed Dec. 2, 2011. The disclosure of the prior application is considered part of (and is incorporated by reference in) the disclosure of this application.

TECHNICAL FIELD

This disclosure relates generally to resource sharing in microcontrollers.

BACKGROUND

Microcontroller architectures sometimes include peripheral modules for pre-processing and/or post-processing of data before the standard data processing. For example, a microcontroller may include an encryption/decryption peripheral module for processing encrypted frame data before the data is processed by a master display controller that handles decrypted data. Unless the master and peripheral modules are coupled together, the additional processing by the peripheral modules may introduce latency and reduce the overall bandwidth of the processing. It may be useful to configure a microcontroller architecture for additional links for direct data transfer between master and peripheral modules. Such a microcontroller architecture may allow resource sharing between modules and also may cause microcontroller size optimization.

SUMMARY

In a general aspect, a system includes one or more master modules configured to execute instructions embedded in non-transitory machine-readable media and controllable by a processor. The system also includes one or more peripheral modules that are configured to execute instructions embedded in non-transitory machine-readable media and controllable by the processor. The system also includes a system bus with instructions embedded in a non-transitory machine-readable medium and configured to allow data transfer between the one or more master modules and the one or more peripheral modules. A data processing module of the one or more peripheral modules includes a master interface and a slave interface. Both master and slave interfaces are coupled to the system bus.

Particular implementations may include one or more of the following features. The instructions included in the system bus may be operable to cause the system bus to redirect a data transfer to the data processing module. The instructions may be included in a user software interface of the system bus. The redirect may be based on decoding an input pin associated with the data processing module. The redirect may be based on decoding a transfer address. The redirect may be based on decoding which of the one or more peripheral modules is a destination for the data transfer. The redirect may be based on a determination of which master module initiated the data transfer.

The system may include a microcontroller circuit. The data processing module includes instructions for performing encryption and decryption operations. The encryption and decryption operations may include instructions for executing Advanced Encryption Standard (AES) algorithm.

In another general aspect, a method for resource sharing in a microcontroller circuit is implemented by receiving an instruction on a system bus from a master module for a transfer of data to a destination. It is determined whether additional processing is associated with the transfer. Based on determining that additional processing is associated with the transfer, the transfer is redirected to a data processing module by setting an extra address bit in the system bus.

Particular implementations may include one or more of the following features. A data processing module may determine whether that the extra address bit is set in the system bus. Based on determining that the extra address bit is set, the extra address bit may be cleared and a read transfer for the data may be performed. The data processing module may perform additional processing on the data and place the additionally processed data on the system bus. The additionally processed data may be received by the destination.

The data processing module may include a peripheral module including a master interface and a slave interface. The data processing module may be configured to listen on the system bus for transfer instructions. One or more additional peripheral modules may be configured to ignore a transfer when the extra address bit is set.

The extra address bit may be set in the system bus based on determining which master module of one or more master modules initiated the transfer. The extra address bit may be set in the system bus based on determining which peripheral module of one or more peripheral modules is a destination for the transfer.

The transfer may include at least one of a read transfer and a write transfer. The destination may include at least one of a master module and a peripheral module.

Performing additional processing on the data may include performing at least one of encryption and decryption operations on the data. The encryption and decryption operations may include performing instructions for executing Advanced Encryption Standard (AES) algorithm.

The details of one or more disclosed implementations are set forth in the accompanying drawings and the description below. Other features, aspects, and advantages will become apparent from the description, the drawings and the claims.

DETAILED DESCRIPTION

Figure 1:
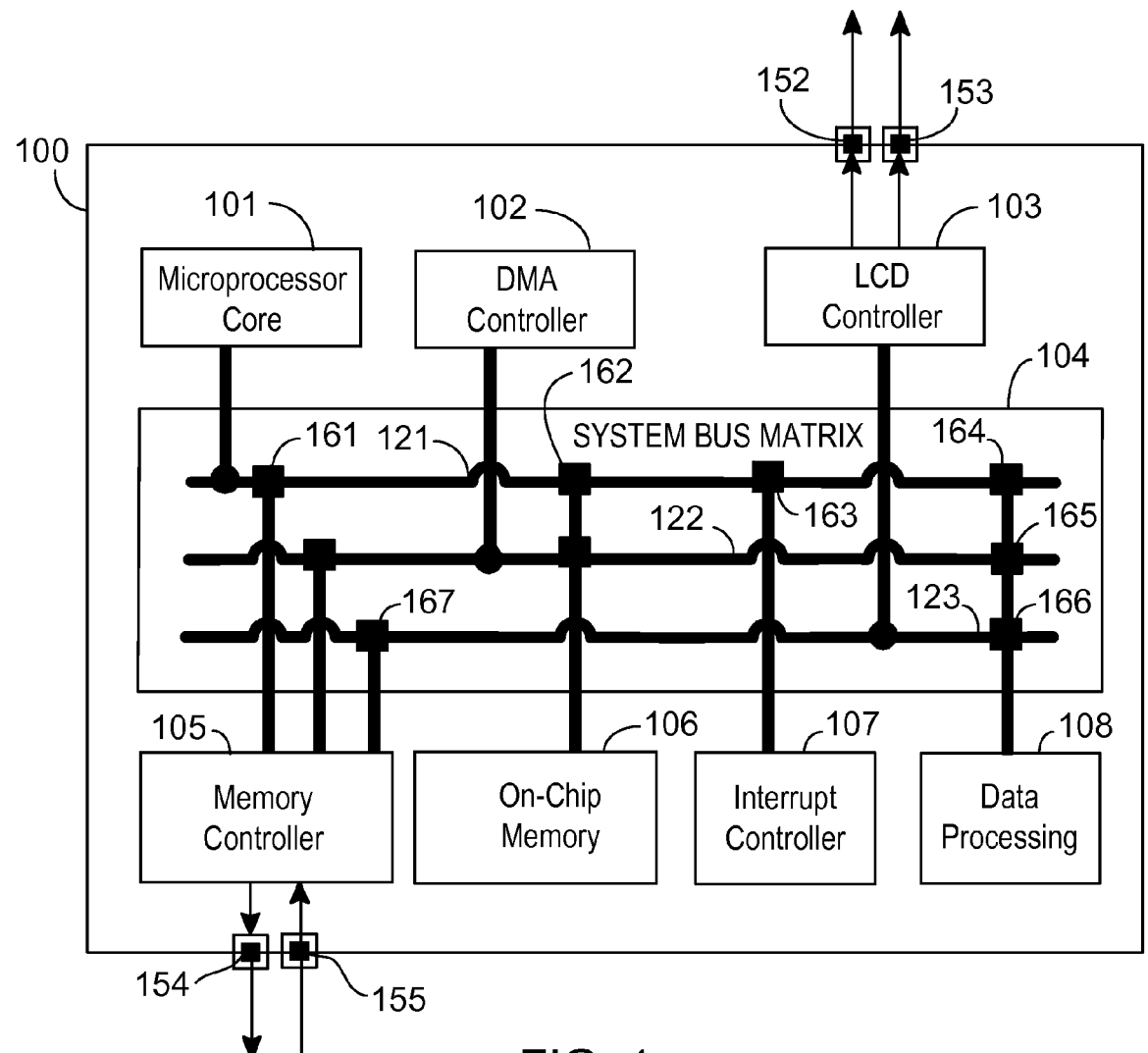
FIG. 1 is a conceptual block diagram of an example system for standard data processing.

FIG. 1 is a conceptual block diagram of an example system 100 for standard data processing. The example system 100 may be a microcontroller architecture that includes a microprocessor core 101, a DMA controller 102, a LCD controller 103, a memory controller 105, an on-chip memory 106, an interrupt controller 107, a data processing module 108 and a system bus matrix 104. The microcontroller architecture also includes terminal pads 152, 153, 154 and 155. System bus matrix 104 includes system bus 121, 122 and 123 that are coupled to the controllers at connectors 161, 162, 163, 164, 165, 166 and 167.

The microprocessor core 101, the DMA controller 102 and the LCD controller 103 are configured to be master modules (referred to interchangeably as "master controllers" or simply as "controllers"). The memory controller 105 the on-chip memory 106 and the interrupt controller 107 are peripheral modules (referred to interchangeably as "slave modules" or simply as "slaves") controlled by the master modules.

The microprocessor core 101 may be any appropriate microprocessor core. For example, the microprocessor core 101 may be an ARM-based core or a digital signal processor (DSP) core. The microprocessor core 101 is configured to run user software loaded into memories that can be located on-chip, e.g., on-chip memory 106, or off-chip and driven by the memory controller 105.

The microprocessor core 101 communicates with external devices via the Direct Memory Access (DMA) controller 102 and the Liquid Crystal Display (LCD) controller 103. For example, the microprocessor core 101 controls a LCD display via the LCD controller 103 and may read/write data from an external memory device (e.g., an off-chip flash memory device, a frame buffer, a hard drive, a memory mapped port, etc.) via the DMA controller 102. The LCD controller 103 reads LCD image data from off-chip memory devices using the memory controller 105, and the DMA controller 102 may read large blocks of data from external memory devices using the memory controller 105.

The system bus matrix 104 can connect the microprocessor core 101, the DMA controller 102, the LCD controller 103 and the memory controller 105. For example, the system bus matrix 104 can include MC_bus 121 that connects the microprocessor core 101 to the memory controller 105, on-chip memory 106, interrupt controller 107 and data processing module 108 via connection points 161, 162, 163 and 164 respectively; DMA_bus 122 that connects the DMA controller 102 to the memory controller 105, on-chip memory 106 and the data processing module 108; and the LCD_bus 123 that connects the LCD controller 103 to the memory controller 105 and the data processing module 108.

The connection points 161, 162, 163 and 164 together represent a read data multiplexer (not shown) on the MC_bus 121. The connection points 164, 165 and 166 together represent a write data multiplexer that are used by the bus 121, 122 and 123 to write to the data processing module 108.

Each bus, e.g., MC_bus 121, includes a read data bus, a write data bus, an address bus and several control signals (not shown). The read data bus of MC_bus 121 is driven by a multiplexer (not shown) that collects the data from the slave modules 105 to 108. The selector input of the multiplexer is driven by a set of signals whose value results from address bus decoding and arbitration of different requests to access a slave module. The write data bus of MC_bus 121 is driven by different slave modules 105 to 108. The microprocessor 101 may be able to access all slave modules using MC_bus 121, but this may not be the case for all master modules. For example, the DMA controller 102 may not use the interrupt controller module 107 and therefore the write data bus of DMA_bus 122 is routed to slave module 105,106 and 108. The LCD controller 103 processes large frame buffers stored in external memory devices, and may not use the on-chip memory 106 or the interrupt controller module 107. The write data bus of LCD_bus 123 is routed to data processing module 108 and memory controller 105 through connection points 166 and 167 respectively, but there is no connection to on-chip memory module 106 or interrupt controller 107, as indicated by the lack of associated connection points on the LCD_bus 123.

Several master controllers can access a same slave module using multiplexed write data bus. For example, the on-chip memory 106 can be accessed by microprocessor core 101 and DMA controller 102. Therefore, the write data bus of MC_bus 121 is multiplexed with write data bus of DMA_bus 122 to drive the on-chip memory 106.

Each bus in the system bus matrix 104 and/or in the system 100 may be thirty-two bits wide. For example, MC_bus 121, DMA_bus 122 and LCD_bus 123 may be thirty-two bits wide. Although the buses may be thirty-two bits wide, memory accesses are not limited to thirty-bit memory accesses. For example, assuming the external memory device is thirty-two bit memory (e.g., a word sized memory), the microprocessor core 101 may issue byte (eight bit) read/write operations, half word (sixteen bit) read/write operations and word (thirty-two) bit read/write operations.

Some of the master modules are configured for interacting with external devices. For example, as described previously, the LCD controller 103 and the memory controller 105 are configured as interface modules for interfacing with external devices such as LCD displays and off-chip memories. The interface modules include terminal pads 152, 153, 154, 155 to drive (or to be driven) by external components, e.g., LCD displays and off-chip memory devices.

In one implementation, the DMA Controller 102 is configured to perform repetitive data processing tasks such as transferring large chunks of data from/to external memory devices. For example, for transferring an LCD data image located in an external memory device to an LCD display, the DMA controller 102 initiates a read access to the memory controller 105 to get first data of the frame buffer and stores the first data into in a first-in-first-out (FIFO) buffer. Once the first data is stored in the FIFO buffer, then a write access can be performed by the LCD controller 103 to process the data for display on the LCD display. After transferring the first data as above, a second data of the frame buffer will be transferred in a similar manner.

Utilizing a DMA controller 102 to perform such a data transfer from an external memory device to a LCD display may be improved by integrating a dedicated DMA module within the LCD controller 103. Such a configuration may reduce resource consumption of the system bus 104 because one transfer (read access from the LCD controller to the external memory device) can perform the operation. A write access from the LCD controller 103 to the system bus 104 may be avoided. In contrast, a standalone DMA controller 102 performs a read access followed by a write access both using system bus bandwidth.

While the data transfer is in progress, a software application code executed by microprocessor core 101 or the DMA controller 102 may have to access the memory controller 105, e.g., because the software application code is loaded into an external memory device, or DMA data buffers of the different channels are stored in the external memory device. Concurrent access to the memory controller 105 may be possible using multiple ports on the memory controller 105. The overall bandwidth from/to the memory controller 105 is constant, and the master modules performing concurrent access share the overall constant bandwidth, thereby resulting in less bandwidth for each master module. Consequently, less bandwidth may be available for correctly displaying an image or limiting the size of the image for correct display (e.g., for no display artifact).

The above configuration of using dedicated DMA modules within master controller modules may be useful when the DMA controller 102 is simultaneously managing several transfers (several DMA channels are used at a time). However, for some types of data transfer that use additional processing, such a configuration may increase the number of accesses to the memory controller 105 and therefore consume the overall bandwidth.

For example, a LCD frame buffer transfer where the data is stored in encrypted form in an external memory device may involve decryption of the data before being displayed on a LCD display using the LCD controller 103. The additional processing may be performed using the data processing module 108. A first channel of the DMA controller 102 is utilized to first read encrypted frame buffer from the off-chip memory using memory controller 105 and feeding the encrypted frame buffer to the data processing module 108. The data processing module 108 performs decryption operation on the data that is fed to the data processing module 108. A second DMA channel sends back the decrypted data (clear frame buffer) to the memory controller 105. Subsequently the embedded DMA of the LCD controller 103 transfers the clear frame buffer to the LCD controller 103.

Without encryption, the data transfer uses repetitive read accesses and consumes a bandwidth of a "basic transfer". However, with the additional processing for decryption, the first channel of the DMA controller 102 consumes 2 times the "basic transfer" bandwidth—1 "basic transfer" bandwidth for the read transfer from memory controller 105 to internal FIFO buffer of DMA controller 102 (not shown) and 1 "basic transfer" bandwidth from the internal FIFO of the DMA controller 102 to the data processing module 108. The second channel of DMA controller 102 transfers the decrypted data back to the memory controller 105 and consumes an additional 2 times the "basic transfer" bandwidth. Subsequently, the clear frame buffer is transferred by the LCD controller 103 consuming a bandwidth equivalent to a "basic transfer". Therefore, the overall operation consumes 5 times the bandwidth of a "basic transfer".

The resource consumption due to the additional processing may be improved by modifying the data processing module 108 to include a master module that initiates the transfer by means of an embedded DMA module within the master module. With such a configuration, one read channel is connected to the data processing module 108 slave interface. The data processing module 108 will use the embedded DMA module to get the data out of the memory by performing a read transfer from memory controller 105, transforms the encrypted frame buffer into a clear frame buffer and put the clear frame buffer on the slave interface to end the DMA controller read transfer. The first channel costs one "basic transfer" time. Then a second DMA controller 102 channel is used to write the processed data (stored in DMA controller 102 internal buffer) to the memory to store the clear frame buffer in memory. The second channel costs one "basic transfer" time. Therefore, the bandwidth used to generated the clear frame buffer is equivalent to 2 times the "basic transfer" bandwidth. Subsequently, the clear frame buffer is transferred by the LCD controller 103 consuming a bandwidth equivalent to a "basic transfer", as described previously. Therefore, using the embedded DMA module in the data processing module 108, the overall operation consumes a bandwidth of 3 times the basic transfer.

Figure 2:
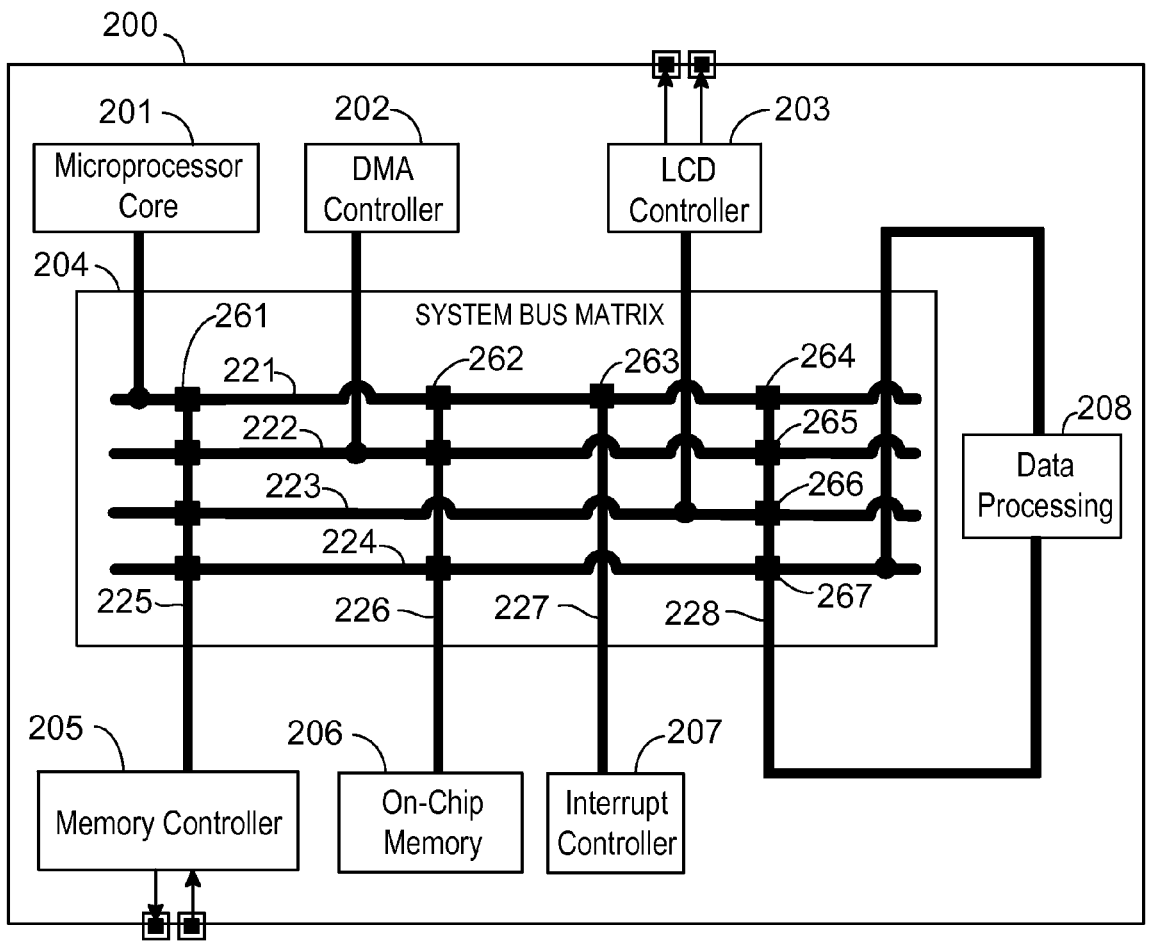
FIG. 2 is a conceptual block diagram of an example system for data processing using master and slave interfaces in the data processing module.

FIG. 2 is a conceptual block diagram of an example system 200 for data processing using master and slave interfaces in the data processing module. The example system 200 may be a microcontroller architecture that includes a microprocessor core 201, a DMA controller 202, a LCD controller 203, a memory controller 205, an on-chip memory 206, an interrupt controller 207, a data processing module 208 and a system bus matrix 204. System bus matrix 204 includes system bus 221, 222, 223, 224, 225, 226, 227 and 228 that are coupled to the controllers at connection points 261, 262, 263, 264, 265, 266 and 267.

The microprocessor core 201, the DMA controller 202 and the LCD controller 203 are configured to be master controllers that are similar to the microprocessor core 101, the DMA controller 102 and the LCD controller 103 respectively. The memory controller 205, the on-chip memory 206 and the interrupt controller 207 are slave modules controlled by the master controllers; the slave modules are similar to the respective slave modules of system 100. However, the master and slave modules of microcontroller architecture 200 are configured for additional processing based on setting an additional address bit in the system bus 204, as described in the following sections.

The data processing module 208 includes a master interface and a slave interface. Both master and slave interfaces are connected to the system bus matrix 204. The data processing module 208 can catch transfers directly on the system bus to process the data (the system bus matrix 204 handles the transfer redirection) and then place the transfer on the system bus 204 with the processed data.

The system bus matrix 204 connects the microprocessor core 201, the DMA controller 202, the LCD controller 203 and the master interface of the data processing module 208 to the memory controller 105, on-chip memory 106, interrupt controller 107 and slave interface of the data processing module 208. For example, the system bus matrix 204 includes MC_bus 221 that connects the microprocessor core 201 to the memory controller 205, on-chip memory 206, interrupt controller 207 and slave interface of data processing module 208 via connection points 261, 262, 263 and 264 respectively; DMA_bus 222 that connects the DMA controller 202 to the memory controller 205, on-chip memory 206 and the slave interface of the data processing module 208; the LCD_bus 223 that connects the LCD controller 203 to the memory controller 205 and the slave interface of the data processing module 108; and the DP_bus 224 that connects the master interface of the data processing module 208 to the memory controller 205, on-chip memory 206 and the slave interface of the data processing module 208.

System bus 225 provides access to memory controller 205 and is connected to bus 221, 222, 223 and 224. System bus 228 provides direct access to the data processing module 208 and is connected to bus 221, 222, 223 and 224. Each system bus 225 and 228 include read data bus, write data bus, address bus and control signals connected to bus 221, 222, 223 and 224.

The system bus matrix 204 includes a mechanism to determine which data transfer to redirect to the data processing module 208. The mechanism involves using an extra address bit in the system bus address to indicate if the transfer is to be redirected to the data processing module 208. When the extra address bit is set all slave modules except the data processing module 208 ignore the transfer.

The extra address bit may be set or unset based on which master controller initiates the transfer, which slave module is the destination, and the address or the range of addresses used for the transfer. If the extra address bit is set, the system bus matrix 204 redirects the corresponding transfer to the data processing module 208 through bus 228 and all other slave modules ignore the transfer.

In one example implementation, decryption of an encrypted frame buffer prior to display on a LCD display is performed using the microcontroller architecture 200. The LCD display frame buffers are stored in an external memory device coupled to the memory controller 205. The frame buffers are encrypted using an encryption algorithm, e.g., Advanced Encryption Standard (AES).

The LCD controller 203 initiates a read data transfer on system bus 223 with the memory controller 205 as destination. In one implementation, the LCD controller 203 sets the extra address bit in the system bus to indicate that the data is to be additionally processed by the data processing module 208. However, in other implementations, the system bus matrix 204 sets the extra address bit for the read data transfer to flag the additional processing, thereby redirecting the transfer to bus 228. Other slave modules ignore the transfer due to the extra address bit being set.

The data processing module 208 decodes the read data transfer instruction and, using the master interface of the data processing module 208, initiates a read data transfer on bus 225 without the extra address bit being set, which instructs the memory controller 205 to provide the data. The memory controller 205 provides the requested data on bus 225 and the data processing module performs the decryption of the data while bus 228 is held in wait state mode for the time interval the data is decrypted. When the decryption process completes, the decrypted data is placed on system bus 228. The LCD controller bus gets the decrypted data on bus 223 and processes it. The bandwidth for this read data transfer is limited to a frame buffer read transfer.

In one example implementation, the data processing module 208 is used to perform processing on data during a write transfer. For example, the LCD controller 203 initiates a write data transfer on system bus 223 for a clear frame buffer with memory controller 205 as destination. An external memory device coupled to the memory controller 205 may store the frame buffers in encrypted form. The clear frame buffer may be processed by the data processing module 208 before being written in encrypted form to the external memory device. In such an implementation, when the data processing module 208 sees a write transfer with the extra address bit set on its slave interface, the data processing module 208 stores the associated data in its internal buffer. For the master controller that initiated the write transfer, e.g., LCD controller 203, the transfer ends at this point as the data has been received. Then the data processing module 208 processes the data (e.g., encrypting the clear frame buffer) and uses its master interface to initiate a write transfer without the extra address bit and with memory controller 205 as destination.

Other master modules like the microprocessor core 201, or the DMA controller 202, or both, can perform direct access to the memory controller 205 through bus 225 or the on-chip memory 206 without additional data processing. Alternatively, the system bus matrix 204 may be configured to redirect the access or part of the access from the microprocessor core 201, or DMA controller 202, or both, to the data processing module 208 by again setting the extra address bit.

When the extra address bit is not set, the data processing module 208 is accessible on the system bus 204 similar to the data processing module 108. Consequently, the data processing module 208 can be used in standalone mode by means of bus 228. In the standalone mode, a master controller connected to the system bus matrix 204 can issue a transfer with the address of the data processing module 208 as destination, and without the extra address bit being set. The data processing module 208 uses its slave interface to receive the data. In the case of write transfer, the data processing module 208 processes the data and stores the processed data in its internal buffer, while for read transfer, the data processing module 208 provides the result stored in its internal buffer. For example, the microprocessor core 201 may perform a write transfer with the address of the data processing module 208 as destination, with the extra address bit not set, in order to provide data to be processed by the data processing module 208. The result of the write transfer would be stored in an internal buffer of the data processing module 208. Then the microprocessor core 201 may issue a read transfer with the address of the data processing module 208 as destination, with the extra address bit not set, to obtain the result stored in the internal buffer of the data processing module 208.

For the above example implementation, the system bus matrix 204 may be configured in several different ways. The system bus matrix 204 may be configured to set the extra address bit for any transfer initiated by the LCD controller 203. This may be useful, for example, in situations where the LCD controller 203 uses only encrypted frame buffer. In a different configuration, the system bus matrix 204 could be configured to set the extra address bit for any transfer with memory controller 205 as destination. The may be useful, for example, in implementations where the external memory device connected to the memory controller 205 stores encrypted data.

In another configuration, the system bus matrix 204 could be configured to implement address-based management of the extra address bit. The may be useful, for example, in implementations where the LCD controller 203 use both encrypted frame buffer and clear frame buffer that are stored at different addresses in the external memory device connected to memory controller 205. The system bus matrix 204 may be configured to use an address table to determine a range of addresses for which the transfer should be redirected to the data processing module 208.

The microcontroller architecture 200 offers the capability to redirect one transfer while other transfers are not redirected based on a decision by the system bus 204. The microcontroller architecture 200 reduces internal bandwidth requirements and offers high flexibility since any transfer can be redirected to the data processing module 208. In addition, standard and redirected transfers can be mixed without any limitation since the internal logic in the system bus matrix 204 will deal with managing the extra address bit on a per transfer basis. The data processing module 208 remains accessible in standalone mode when the extra address bit is not set.

The microcontroller architecture 200 reduces the number of system bus accesses that are made when pre-processing, or post-processing, or both, of data are performed for a data transfer involving a slave module of the microcontroller. By reducing the number of system bus accesses, the overall bandwidth of the processing is improved. The complexity of associated software drivers may be less because synchronization between DMA channels is not needed (only one DMA channel is used), and less processor interruptions have to be handled.

When standard data transfers without additional processing co-exist with pre/post-processed data transfers, the microcontroller architecture 200 provides optimal bandwidth sharing for both types of data transfers. Complex software interventions, e.g., for synchronizing all processes to maintain data coherency and security, are not used. In addition, when several master modules need pre-processed or post-processed data transfer, the data processing module 208 can be shared between all the master modules, and multiple data processing modules do not have to be implemented.

Figure 3:
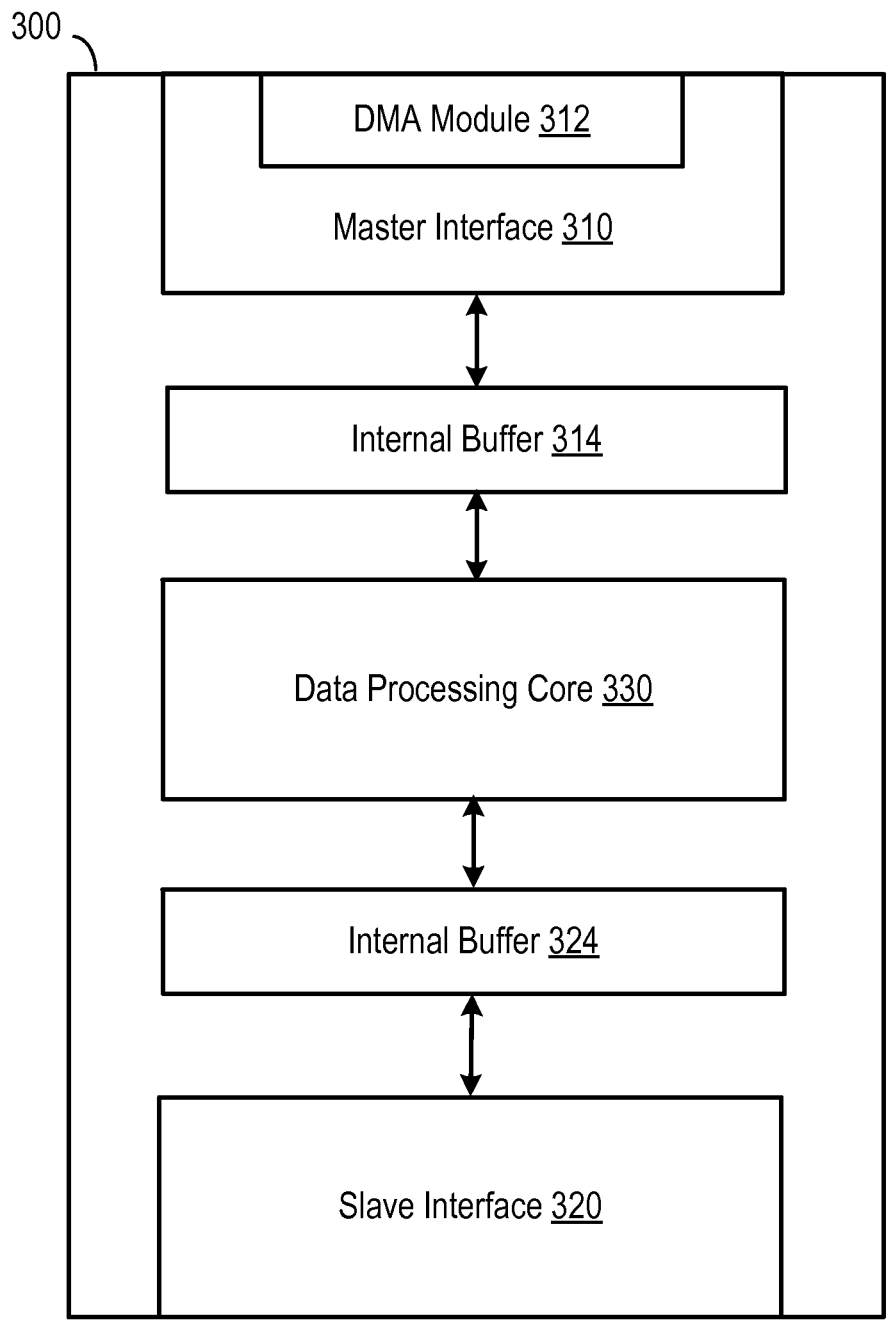
FIG. 3 is a conceptual block diagram of an example system for a data processing module including both master and slave interfaces.

FIG. 3 is a conceptual block diagram of an example system 300 for a data processing module including both master and slave interfaces. The example system 300 may be data processing module that includes a master interface 310, a slave interface 320, DMA module 312, internal buffers 314 and 324, and data processing core 330. The data processing module 300 may be, for example, the data processing module 208. The following describes the example system 300 as being implemented by the data processing module 208 in the microcontroller architecture 200. However, the example system 300 may be implemented by other systems or system configurations.

The master interface 310 is connected to a system bus, e.g., system bus 224. The master interface 310 uses the embedded DMA module 312 to perform a read or write data transfer on the system bus with the destination as the memory controller module, e.g., memory controller 205, or the on-chip memory, e.g., on-chip memory 206. In the case of a read transfer, the master interface 310 caches the data to be pre-processed in the associated internal buffer 314.

The slave interface 320 is also connected to a system bus, e.g., system bus 228. In the case of a write transfer with the extra address bit set, the slave interface 320 caches data to be post-processed in the associated internal buffer 324. In addition, the slave interface 320 caches processed data in the internal buffer 324 for retrieval by a master controller, e.g., when in standalone mode, as described previously.

The data processing core 330 is used to process data that is provided to the data processing core 330 using either internal buffer 314 or 324. After processing, the data processing core 330 places the processed data in the respective internal buffer for further handling by the respective interface.

The data processing module 300 uses the slave interface 320 to listen on the system bus for data transfer instructions that are redirected to the data processing module 300. For example, the slave interface 320 may check whether the extra address bit is set for every data transfer that is performed on the system bus. If the extra address bit is set for a data transfer, the slave interface 320 accepts the data transfer request. In the case of a read transfer initiated by a master module, the master interface 310 uses the embedded DMA module 312 to send a new data transfer request on the system bus, e.g., system bus 224, without the extra address bit being set, to the destination indicated in the original read data transfer instruction, e.g., memory controller 205. The embedded DMA module 312 receives the data requested by the transfer on the system bus 224 and the master interface 310 places the data in the internal buffer 314 for processing by the data processing core 330. Once the data is processed by the data processing core 330 and stored in internal buffer 324, the slave interface 320 places the processed data on the system bus, e.g., system bus 228, and the read transfer initiated by the LCD controller 203 ends (for example, with decrypted data on the bus).

In case of a write transfer (e.g., from a master module to an external memory device), the slave interface 320 places the data associated with the write transfer in internal buffer 324 for processing by the data processing core 330. For the master module that initiated the write transfer, the transfer ends here (for example, with posted write method). Once the data is processed by the data processing core 330, the processed data is placed in the internal buffer 314 and the master interface 310 uses the embedded DMA module 312 to send a new write data transfer request on the system bus, e.g., system bus 224, to the destination indicated in the original write data transfer instruction. Consequently, the processed data is sent to its original destination, e.g., the external memory device.

The data processing module 300 uses the slave interface 320 to perform conventional data processing based on instructions received from master controllers, e.g., processing core 201. As described previously, a master controller may perform a read or write data transfer on the memory controller 205 with the extra address bit not set, and provide the address of the data processing module 300 as the destination. In one implementation, the destination address may be an address for the slave interface 320.

Figure 4:
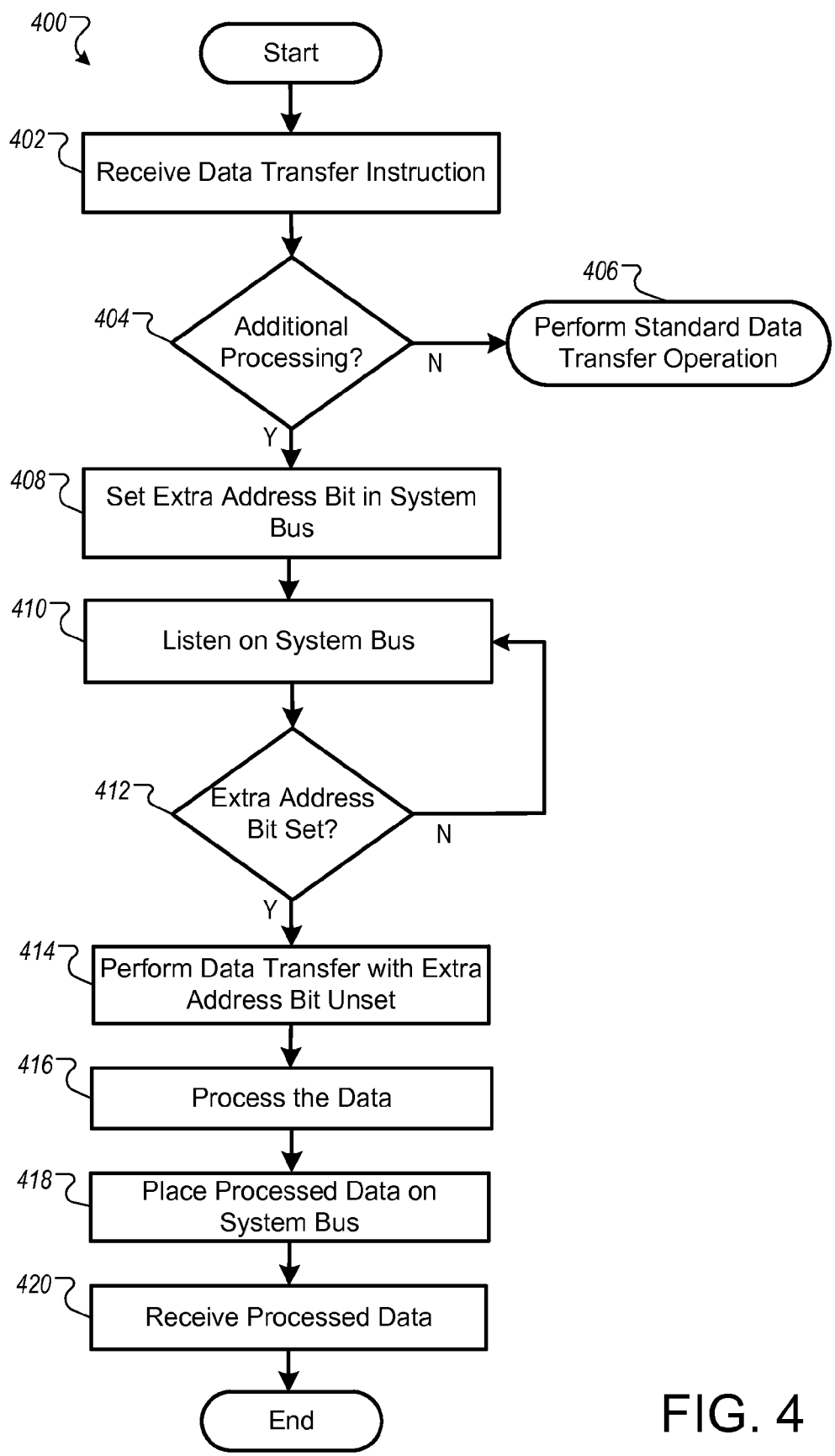
FIG. 4 is a flow diagram of an exemplary process for data processing in a read transfer using a data processing module with both master and slave interfaces.

FIG. 4 is a flow diagram of an exemplary process 400 for data processing in a read transfer using a data processing module with both master and slave interfaces. The process 400 may be performed by a microcontroller architecture that includes a processing module with both master and slave interfaces. For example, the process 400 may be performed by the microcontroller architecture 200. The following describes the process 400 as being performed by components of the example system 200. However, the process 400 may be performed by other systems or system configurations.

The process 400 begins when a data transfer instruction is received in the system bus (402). In one implementation, the data transfer instruction is a read transfer. For example, the LCD controller 203 may issue a read memory command directed to the memory controller 205, to read a frame buffer that is stored in an external memory device coupled to the memory controller 205.

Upon receiving the data transfer instruction, the system bus determines whether the data needs additional processing (404). For example, the data that is retrieved based on the transfer instruction may need pre-processing before being handled by the master controller that issued the transfer instruction.

If the system bus determines that the data does not need additional processing, the system bus performs standard data transfer operation (406). For example, the frame buffer may be stored in unencrypted form in the external memory device. The read memory command is forwarded on the system bus with the extra address bit not set. The memory controller 205 receives the read memory command since it is the destination indicated in the command, and performs the data transfer operation.

On the other hand, if the system bus determines that the data needs additional processing, the extra address bit is set in the system bus (408). For example, the LCD controller 203 may be configured to process unencrypted data, while the frame buffer is stored as encrypted data in the external memory device. Therefore, the encrypted frame buffer has to be decrypted before sending to the LCD controller 203. The system bus 204 may determine that the data needs additional processing based on the address of the master module, or the address of the destination memory, or both, as described previously. In one implementation, the extra address bit may be set by the master module initiating the data transfer, while in other implementations, the extra address bit is set by the system bus.

The data processing module listens on the system bus (410). For example, the slave interface of the data processing module 208 listens on the system bus 224 to determine whether a data transfer instruction is redirected to the data processing module 208. The slave interface module determines whether the extra address bit is set for a data transfer instruction on the system bus (412). If the extra address bit is not set, then the transfer instruction is not redirected to the data processing module, the data processing module 208 ignores the transfer and the slave interface listens on the system bus for the next transfer instruction (410).

If the extra address bit is set in the system bus, then the data transfer instruction is redirected to the data processing module. The slave interface of the data processing module accepts the data transfer instruction upon determining that the extra address bit is set, while all other slave modules ignore the transfer instruction due to the extra address bit being set. The data processing module performs a data transfer on the system bus with the extra address bit being unset (414). The data processing module performs the data transfer through its master interface and without the extra address bit being set. The data transfer is for the data indicated in the original transfer instruction, and the transfer is directed to the destination in the original transfer instruction. For example, the master interface of the data processing module 208 issues a read transfer instruction with the memory controller 205 as the destination, for an encrypted LCD frame buffer that is stored in the external memory device. The memory controller 205 accepts the read transfer instruction since the extra address bit is not set, retrieves the encrypted frame buffer from the external memory device, and places the data on the system bus. Consequently, the data processing module 208 receives the encrypted data from the system bus.

The data processing module processes the data (416). For example, the data processing module 208 places the encrypted frame buffer in an internal buffer (e.g., internal buffer 314). The data processing module (e.g., data processing core 330) decrypts the frame buffer and puts the clear frame buffer in the internal buffer (e.g., internal buffer 324).

The data processing module places the processed data on the system bus (418). For example, the data processing module 208 places the clear frame buffer on the system bus 228. Consequently, the destination receives the processed data (420). For example, the master controller (e.g., LCD controller 203), obtains the clear frame buffer from the system bus 228 and displays the frame buffer on the external LCD display. Thus, in one implementation, the microcontroller architecture 200 can implement the process 400 to perform data processing for a read transfer instruction using a data processing module with both master and slave interfaces.

Figure 5:
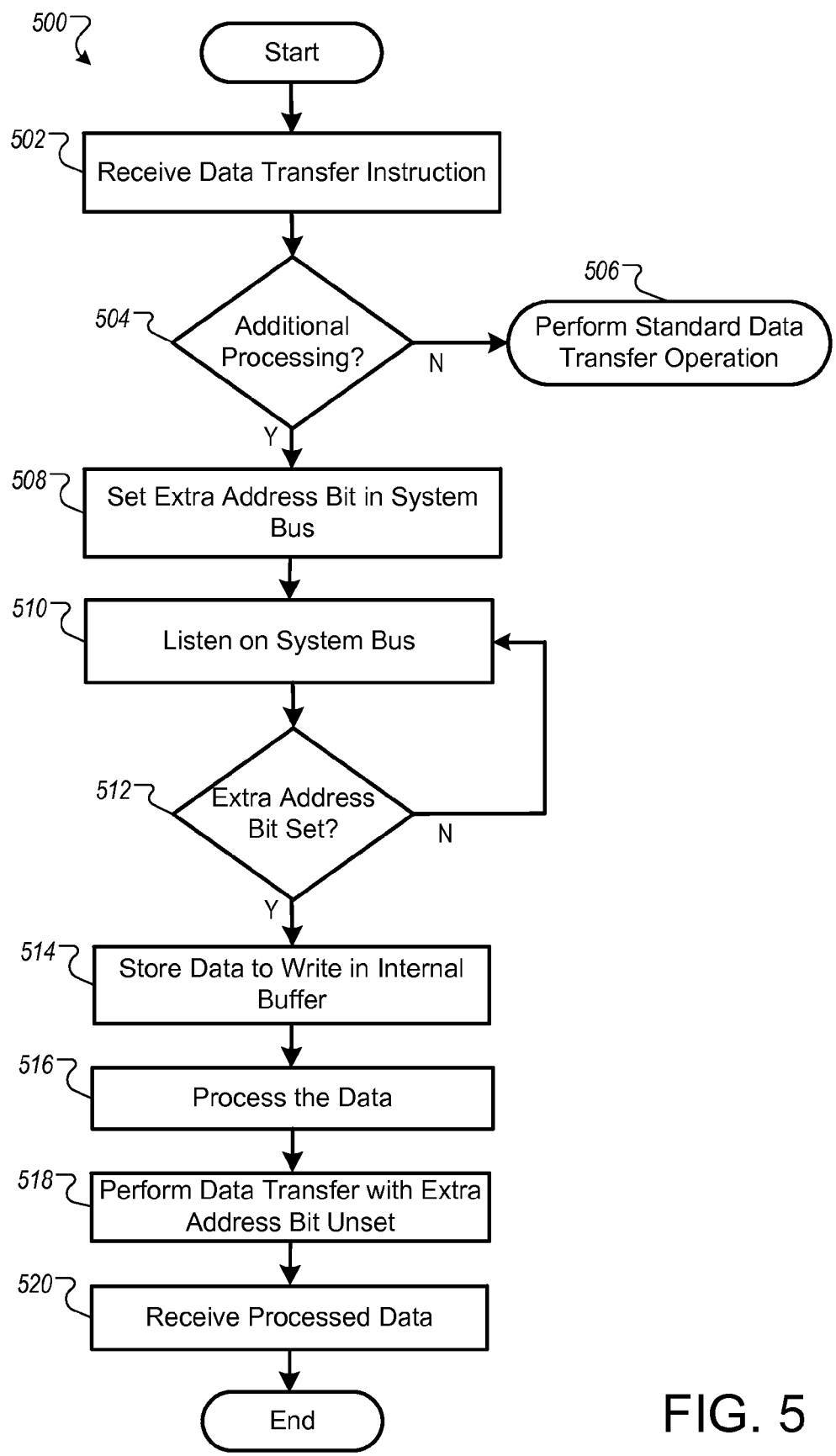
FIG. 5 is a flow diagram of an exemplary process for data processing in a write transfer using a data processing module with both master and slave interfaces.

FIG. 5 is a flow diagram of an exemplary process 500 for data processing in a write transfer using a data processing module with both master and slave interfaces. The process 500 may be performed by a microcontroller architecture that includes a processing module with both master and slave interfaces. For example, the process 500 may be performed by the microcontroller architecture 200. The following describes the process 500 as being performed by components of the example system 200. However, the process 500 may be performed by other systems or system configurations.

The process 500 begins when a data transfer instruction is received in the system bus (502). For example, the LCD controller 203 may issue a write memory command directed to the memory controller 205, to write a frame buffer to an external memory device coupled to the memory controller 205.

Upon receiving the data transfer instruction, the system bus determines whether the data needs additional processing (504). The data for the transfer instruction may need post-processing before being handled by the destination module. For example, in one implementation, the LCD controller 203 may transfer a clear frame buffer, while the external memory device coupled to the memory controller 205 may store frame buffers in encrypted form. Therefore, the clear frame buffer sent by the LCD controller 203 is to be encrypted before being sent to the memory controller 205.

If the system bus determines that the data does not need additional processing, the system bus performs standard data transfer operation (506). For example, in one implementation, the external memory device may store the frame buffer in unencrypted form. The write memory command is forwarded on the system bus with the extra address bit not set. The memory controller 205 receives the write memory command since it is the destination indicated in the command, and performs the data transfer operation.

On the other hand, if the system bus determines that the data needs additional processing, the extra address bit is set in the system bus (508). For example, a clear frame buffer has to be encrypted before being stored in the external memory device. The system bus 204 may determine that the data needs additional processing based on the address of the master module, or the address of the destination memory, or both, as described previously. In one implementation, the extra address bit may be set by the master module initiating the data transfer, while in other implementations, the extra address bit is set by the system bus.

The data processing module listens on the system bus (510). For example, the slave interface of the data processing module 208 listens on the system bus 228 to determine whether a data transfer instruction is redirected to the data processing module 208. The slave interface module determines whether the extra address bit is set for a data transfer instruction on the system bus (512). If the extra address bit is not set, then the transfer instruction is not redirected to the data processing module, the data processing module 208 ignores the transfer and the slave interface listens on the system bus for the next transfer instruction (510).

If the extra address bit is set in the system bus, then the data transfer instruction is redirected to the data processing module. The slave interface of the data processing module accepts the data transfer instruction and the associated data sent with the write transfer upon determining that the extra address bit is set, while all other slave modules ignore the transfer instruction due to the extra address bit being set. The data processing module stores the data to write in internal buffer (514). For example, the slave interface of the data processing module 208 accepts the write transfer from the LCD controller 203 and stores the associated clear frame buffer in the internal buffer (e.g., internal buffer 314) of the data processing module 208.

The data processing module processes the data (516). For example, the data processing module 208 (e.g., data processing core 330) encrypts the clear frame buffer and puts the encrypted frame buffer in the internal buffer (e.g., internal buffer 324).

The data processing module performs a data transfer with the extra address bit unset (518). For example, the master interface of the data processing module 208 makes a write command on the system bus 224 with the encrypted frame buffer as data. Consequently, the destination receives the processed data (520). For example, the slave peripheral (e.g., memory controller 205), obtains the encrypted frame buffer from the master interface of the data processing module 208 connected to the system bus 224 and stores the encrypted frame buffer in the external memory device coupled to the memory controller 205. Thus, in one implementation, the microcontroller architecture 200 can implement the process 500 to perform data processing for a write transfer instruction using a data processing module with both master and slave interfaces.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A device comprising:
   a master module;
   a peripheral module;
   a data processing module; and
   a system bus coupled to the master module, the peripheral module and the data processing module, the system bus configured to perform operations comprising:
      receiving an instruction from the master module for a transfer of data associated with the peripheral module;
      determining that the data to be transferred is to be processed by the data processing module before being received at its destination; and
      based on a determination that the data is to be processed by the data processing module, redirecting the transfer to the data processing module.

2. The device of claim 1, further comprising additional master modules and additional peripheral modules, wherein the determination that the data is to be processed by the data processing module comprises at least one of:
   determining which master module initiated the transfer,
   determining which peripheral module is associated with the transfer, or
   determining a range of memory addresses corresponding to the data to be transferred.

3. The device of claim 1, wherein redirecting the transfer to the data processing module comprises:
   based on the determination that the data is to be processed by the data processing module, setting an extended address field in the system bus.

4. The device of claim 1, wherein redirecting the transfer to the data processing module comprises:
   determining whether an extended address field associated with the system bus is set by the master module; and
   based on a determination that the extended address field associated with the system bus is set by the master module, redirecting the transfer to the data processing module.

5. The device of claim 1, wherein the master module includes one of a microprocessor core, a direct memory access (DMA) controller, or a liquid crystal display (LCD) controller.

6. The device of claim 1, wherein the peripheral module includes one of a memory controller, device memory, or an interrupt controller.

7. The device of claim 1, wherein the data processing module includes a master interface and a slave interface, and wherein the data processing module is configured to perform operations comprising:
   detecting, on the system bus, an indication that the data to be transferred is to be processed by the data processing module;
   based on the detection, performing the transfer of the data to the data processing module;
   processing the data; and
   placing the processed data on the system bus.

8. The device of claim 7, wherein detecting the indication comprises detecting that an extended address field is set in the system bus.

9. The device claim 8, wherein the transfer is a read transfer, and wherein the data processing module is configured to perform operations comprising:
   detecting the indication that the data to be transferred is to be processed by the data processing module using the slave interface;
   based on the detection, performing the transfer of the data to the data processing module using the master interface, wherein performing the transfer of the data includes clearing the extended address field in the system bus; and
   placing the processed data on the system bus using the slave interface.

10. The device of claim 8, wherein the transfer is a write transfer, and wherein the data processing module is configured to perform operations comprising:
    detecting the indication that the data to be transferred is to be processed by the data processing module using the slave interface;
    based on the detection, performing the transfer of the data to the data processing module using the slave interface; and
    writing the processed data to the peripheral module using the master interface, wherein writing the processed data to the peripheral module comprises clearing the extended address field in the system bus.

11. A device comprising:
    a master module;
    a peripheral module;
    a system bus that is configured to process an instruction from the master module for transfer of data associated with the peripheral module; and
    a data processing module that is coupled to the system bus, the data processing module configured to perform operations comprising:
       detecting, on the system bus, an indication that the data to be transferred is to be processed by the data processing module before being received at its destination;
       based on the detection, performing the transfer of the data to the data processing module;
       processing the data; and
       placing the processed data on the system bus.

12. The device of claim 11, wherein data processing module includes a master interface and a slave interface, and wherein detecting the indication comprises detecting that an extended address field is set in the system bus.

13. The device of claim 11, wherein the master module includes at least one of a microprocessor core, a direct memory access (DMA) controller, or a liquid crystal display (LCD) controller.

14. The device of claim 11, wherein the peripheral module includes at least one of a memory controller, device memory, or an interrupt controller.

15. The device of claim 12, wherein the transfer is a read transfer, and wherein the data processing module is configured to perform operations comprising:
    detecting, using the slave interface, the indication that the data to be transferred is to be processed by the data processing module;

performing the transfer of the data to the data processing module using the master interface, wherein performing the transfer of the data includes clearing the extended address field in the system bus; and placing the processed data on the system bus using the slave interface.

16. The device of claim 12, wherein the transfer is a write transfer, and wherein the data processing module is configured to perform operations comprising:

detecting, using the slave interface, the indication that the data to be transferred is to be processed by the data processing module;

performing the transfer of the data to the data processing module using the slave interface; and writing the processed data to a peripheral module using the master interface, wherein writing the processed data to the peripheral module comprises clearing the extended address field in the system bus.

17. The device of claim 12, wherein the data processing module comprises a direct memory access (DMA) module included in the master interface, the DMA module configured to perform operations comprising:

performing the transfer of the data from a memory module to the data processing module for a read transfer; and writing the processed data from the data processing module to a memory module for a write transfer.

18. The device of claim 12, wherein the system bus is configured to set the extended address field based on a determination that the data to be transferred is to be processed by the data processing module before being received at its destination.

19. The device of claim 18, wherein the device includes additional master modules and additional peripheral modules, and wherein the determination that the data to be transferred is to be processed by the data processing module comprises at least one of:

determining which master module initiated the transfer, determining which peripheral module is associated with the transfer, or determining a range of memory addresses corresponding to the data to be transferred.

20. A method comprising:

receiving, at a system bus, an instruction from a master module for a transfer of data associated with a peripheral module;

determining, by the system bus, that the data to be transferred is to be processed by the data processing module before being received at its destination; and based on the determination that the data is to be processed by the data processing module, redirecting the transfer to the data processing module.

21. The method of claim 20, wherein determining that the data is to be processed by the data processing module comprises at least one of:

determining which master module initiated the transfer, determining which peripheral module is associated with the transfer, or determining a range of memory addresses corresponding to the data to be transferred.

22. The method of claim 20, wherein redirecting the transfer to the data processing module comprises:

based on the determination that the data is to be processed by the data processing module, setting, by the system bus, an extended address field in the system bus.

23. The method of claim 20, wherein redirecting the transfer to the data processing module comprises:

determining whether an extended address field associated with the system bus is set by the master module; and based on a determination that the extended address field associated with the system bus is set by the master module, redirecting the transfer to the data processing module.

24. The method of claim 20, further comprising:

detecting, by the data processing module, an indication associated with the system bus that the data to be transferred is to be processed by the data processing module;

based on the detection, transferring, by the data processing module, the data to the data processing module;

processing, by the data processing module, the data; and placing, by the data processing module, the processed data on the system bus.

25. The method of claim 24, wherein detecting the indication comprises detecting that an extended address field is set in the system bus.

* * * * *

UNITED STATES PATENT AND TRADEMARK OFFICE
CERTIFICATE OF CORRECTION

PATENT NO. : 9,317,462 B2
APPLICATION NO. : 14/659074
DATED : April 19, 2016
INVENTOR(S) : Guillaume Pean et al.

Page 1 of 1

It is certified that error appears in the above-identified patent and that said Letters Patent is hereby corrected as shown below:

In the Claims

Column 14 Line 8 in Claim 9, after "device" insert --of--.

Column 14 Line 51 in Claim 12, after "wherein" insert --the--.

Signed and Sealed this
Twenty-first Day of June, 2016

Michelle K. Lee
*Director of the United States Patent and Trademark Office*